United States Patent
Stein et al.

(10) Patent No.: US 11,823,409 B1
(45) Date of Patent: Nov. 21, 2023

(54) SYSTEMS AND METHODS FOR SINGLE-AXIS TRACKING VIA SKY IMAGING AND MACHINE LEANRING COMPRISING A NEURAL NETWORK TO DETERMINE AN ANGULAR POSITION OF A PHOTOVOLTAIC POWER SYSTEM

(71) Applicant: National Technology & Engineering Solutions of Sandia, LLC, Albuquerque, NM (US)

(72) Inventors: Joshua Stein, Albuquerque, NM (US); Jennifer Lee Braid, Albuquerque, NM (US); Benjamin Garrett Pierce, Albuquerque, NM (US); Daniel Riley, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 156 days.

(21) Appl. No.: 17/550,048

(22) Filed: Dec. 14, 2021

Related U.S. Application Data

(60) Provisional application No. 63/126,708, filed on Dec. 17, 2020.

(51) Int. Cl.
*G06T 7/70* (2017.01)
*G06T 5/00* (2006.01)

(52) U.S. Cl.
CPC .............. *G06T 7/70* (2017.01); *G06T 5/002* (2013.01); *G06T 2207/20084* (2013.01); *G06T 2207/30181* (2013.01)

(58) Field of Classification Search
CPC . G06T 7/70; G06T 5/002; G06T 2207/20084; G06T 2207/30181
(Continued)

(56) References Cited

U.S. PATENT DOCUMENTS 10,281,552 B2    5/2019  Augustyn
11,476,795 B2 *  10/2022 West ..................... G06N 5/01

OTHER PUBLICATIONS

Ineichen, P., Zelenka, A., Guisan O., and Razafindraibe A., Solar Radiation Transposition Models Applied to a Plane Tracking the Sun, Solar Energy, 1988, 371-377, vol. 41, Issue No. 4, Pergamon Press, United States of America.
(Continued)

*Primary Examiner* — Que Tan Le
*Assistant Examiner* — Mai Thi Ngoc Tran
(74) *Attorney, Agent, or Firm* — Daniel J. Jenkins

(57) ABSTRACT

A system and method is disclosed for solar tracking and controlling an angular position of a photovoltaic power system. The solar tracking system includes an imaging device for capturing images of the sky; a solar position data generating module; and a control system comprising a neural network. The neural network has multiple convolutional layers to generate a first output associated with the images, and a solar position data module. A first dense layer module receives the solar position data and generates a second output. A second dense layer module receives the first output and the second output and generates a concatenated data sequence. A processor is programmed to generate a multi-planar irradiance signal (MPIS) in response to the concatenated data sequence, and determine an angular position of the PV power system and adjust the angular position in response to an angle of maximum irradiance.

20 Claims, 5 Drawing Sheets

(58) Field of Classification Search
USPC .................................................. 250/203.4
See application file for complete search history.

(56) References Cited

OTHER PUBLICATIONS

Ineichen, Pierre and Perez, Richard, A New Airmass Independent Formulation for the Linke Turbidity Coefficient, Solar Energy, Jun. 2002, 151-157, vol. 73, Elsevier, Great Britain.

Reda, I. and Andrea, A., Solar Position Algorithm for Solar Radiation Applications, Solar Energy, 2004, vol. 76, 677-589, Elsevier, Amsterdam, Netherlands.

Long, C.N., Sabburg, J.M., Calbo, J. and Pages, D., Retrieving Cloud Characteristics from Ground-Based Daytime Color All-Sky Images, Journal of Atmospheric and Oceanic Technology, May 2006, 633-652, vol. 23, American Meteorological Society, Boston, MA.

Alonso, J. and Batlles, F.J., Short and Medium-Term Cloudiness Forecasting Using Remote Sensing Techniques and Sky Camera Imagery, Energy, Jul. 2014, 890-897, vol. 73, Elsevier, Amsterdam, Netherlands.

Savoy, F.M., Dev, S., Lee, Y.H. and Winkler, S., Geo-Referencing and Stereo Calibration of Ground-Based Whole Sky Imagers Using the Sun Trajectory, IGARSS, 2016, 7473-7476, IEEE, New York, NY.

Sun, Y., Zhu, L., Wang, G. and Zhao, F., Multi-Input Convolutional Neural Network for Flower Gardening, Journal of Electrical and Computer Engineering, Aug. 31, 2017, 1-8, vol. 2017, Hindawi, London, Great Britain.

Holmgren, W.F., Hansen, C.W. and Mikofski, M.A., Pvlib Python: A Python Package for Modeling Solar Energy Systems, The Journal of Open Source Software, Sep. 7, 2018, 3 pages, vol. 29, Issue No. 3, JOSS, United States of America.

Paletta, Q. and Lasenby, J., Convolutional Neural Networks Applied to Sky Images for Short-Term Solar Irradiance Forecasting, EU-PVSEC, May 22, 2020, 1-4.

\* cited by examiner

SYSTEMS AND METHODS FOR SINGLE-AXIS TRACKING VIA SKY IMAGING AND MACHINE LEANRING COMPRISING A NEURAL NETWORK TO DETERMINE AN ANGULAR POSITION OF A PHOTOVOLTAIC POWER SYSTEM

CROSS-REFERENCE TO RELATED PATENT APPLICATIONS

This patent application claims the benefit of and priority to U.S. Provisional Patent Application Ser. No. 63/126,708 filed Dec. 17, 2020, entitled "SYSTEMS AND METHODS FOR SINGLE-AXIS TRACKING VIA SKY IMAGING AND MACHINE LEARNING", which is hereby incorporated in its entirety.

STATEMENT REGARDING FEDERALLY SPONSORED RESEARCH OR DEVELOPMENT

The United States Government has rights in this invention pursuant to Contract No. DE-NA0003525 between the United State Department of Energy and National Technology & Engineering Solutions of Sandia, LLC, both for the operation of the Sandia National Laboratories.

BACKGROUND OF THE INVENTION

The present disclosure is generally directed to predictive tracking, and more particularly directed to sky imaging for predictive sun tracking.

Solar energy systems may include the ability to reposition and/or track photovoltaic (PV) arrays to align with the sun and increase the solar irradiation incident on the system. There are well established equations to determine sun position and calculate the angle for a single axis tracker, which will maximize solar energy when the sun is not obscured. However, when the sun is obscured by clouds, most modern tracking systems continue to follow the sun's position, which may not capture the maximum amount of solar irradiance available in these conditions. During completely overcast conditions, a near horizontal orientation will maximize energy gain, but for partly cloudy or transitional conditions, there are no known ways to determine the optimum angle for a tracker to maximize solar energy harvest nor are there known ways to forecast future optimal tracker positions.

For partly cloudy or transitional conditions, the optimal position of the tracker depends on the overall cloud coverage and spatial pattern in both the current time and the future. For example, when it is near solar noon, it is optimal to position panels horizontally, facing the sun. If there is evidence of cloud cover in the morning and clouds are predicted to persist, it may be advantageous to move the tracker to a horizontal position before solar noon. However, if clouds are present in the morning, but the cloudy period is predicted to be short, it may be detrimental to move the tracker to a horizontal position as this would be suboptimal when the clouds disperse and moving the tracker takes time and energy to move and excessive tracker movement can lead to equipment wear out and early failures.

For any photovoltaic (PV) system, it may be necessary to profile the site in order to have a working knowledge of the solar insolation available for various system configurations. Solar insolation is dependent on the angular position of the plane of measurement. The solar resource profile is important for both fixed-tilt and tracking photovoltaic systems, as it informs the optimal position of the modules; the more irradiance the module receives, the greater the power it generates. On clear-sky days, the irradiance versus tilt angle profile is easy to predict from the sun's position. However, on partially or fully overcast days, the irradiance profile can be severely distorted due to the obstruction and scattering of light by clouds. The increase in diffuse light and reduction in direct irradiance leads to a relative reduction in power conversion efficiency for PV systems that continue to track the sun's position throughout these conditions. Optimal tracking of the angle of maximum irradiance, as opposed to solar position, can increase the power production of single-axis tracking PV systems by up to 2% per year, without modification of the tracking mechanism.

What is needed are sky imaging systems and processes that overcome these and other deficiencies. Other features and advantages will be made apparent from the present specification. The teachings disclosed extend to those embodiments that fall within the scope of the claims, regardless of whether they accomplish one or more of the aforementioned needs.

SUMMARY OF THE INVENTION

One embodiment relates to a solar tracking system for controlling an angular position of a photovoltaic power system. The solar tracking system includes an imaging device for capturing images of the sky; a solar position data generating module; and a control system comprising a neural network. The neural network has a plurality of convolutional layers configured to generate a first output associated with the images, and a solar position data module. A first dense layer module receives the solar position data and generates a second output. A second dense layer module receives the first output and the second output and generates a concatenated data sequence. A processor is programmed to generate a multi-planar irradiance signal (MPIS) in response to the concatenated data sequence, and determine an angular position of the PV power system and adjust the angular position in response to an angle of maximum irradiance.

Another embodiment relates to a method of solar tracking for controlling a PV power system. The method includes capturing images of a sky; generating a solar position data; providing a convolutional layer neural network (CNN); generating a first output associated with the sky images; receiving the solar position data and generating a second output; receiving the first output and the second output; generating a concatenated data sequence; generating a multi-planar irradiance signal (MPIS) in response to the concatenated data sequence; determining an angular position of the PV power system; and adjusting the angular position in response to an angle of maximum irradiance based on the concatenated data sequence.

Another embodiment relates to at least one non-transitory machine-readable medium including a plurality of instructions, which when executed by one or more processors, cause performance of a method comprising: capturing images of a sky; generating a solar position data; providing a convolutional layer neural network (CNN) generating a first data set associated with the sky images; receiving the solar position data and generating a second output; receiving the first output and the second output; generating a concatenated data sequence; generating a multi-planar irradiance signal (MPIS) in response to the concatenated data sequence; determining an angular position of the PV power system; and adjusting the angular position in response to an angle of maximum irradiance based on the concatenated data sequence.

An advantage of the disclosure are systems, processes and computer program products that integrate with and control existing single-axis trackers to increase the energy yield of solar energy systems.

Another advantage of the disclosure is prediction of optimal tracker position at the current time and in the future that increases the energy yield of these systems by improving the instantaneous power generation, as well as decreasing unnecessary tracker movement and mechanical wear.

Another advantage of the disclosure is the disclosed improved system does not significantly in-crease energy usage or mechanical wear of the single-axis trackers in comparison to standard tracking routines.

Using the disclosed methods and systems is advantageous because the angular irradiance can be informed in real time by local, observable weather conditions. Previous approaches have been based only on solar position, and fail to account for local weather conditions or patterns.

Sky images provide distinct advantages over multi-angle irradiance sensors because: 1) the sky camera involves no moving parts and a single sensor to collect data, and 2) sky images enable forecasting of future weather conditions, which is not possible with real-time irradiance sensors.

Optimal tracking of the angle of maximum irradiance, as opposed to solar position, can increase the power production of single-axis tracking PV systems by up to 2% per year, without modification of the tracking mechanism.

Another advantage is reduced costs to optimize the solar tracking and power output, as the multi-angle irradiance measurement requires costly hardware, whereas the disclosed neural network system closely matches the angle of maximum irradiance by deploying an inexpensive sky imaging camera and calculated sun position as inputs. Thus, the system requires only an inexpensive sky camera to predict optimal tracker position, after training the neural network with multi-angle irradiance measurements.

Alternative exemplary embodiments relate to other features and combinations of features as may be generally recited in the claims.

BRIEF DESCRIPTION OF THE DRAWINGS

The application will become more fully understood from the following detailed description, taken in conjunction with the accompanying figures, wherein like reference numerals refer to like elements, in which.

DETAILED DESCRIPTION OF THE INVENTION

Before turning to the figures which illustrate the exemplary embodiments in detail, it should be understood that the application is not limited to the details or methodology set forth in the following description or illustrated in the figures. It should also be understood that the phraseology and terminology employed herein is for the purpose of description only and should not be regarded as limiting.

The present disclosure is directed to a tracking system that includes a sky imager for creating a data set that indicates the angle of maximum irradiance; known sun position calculated from time and geographical location; a pre-processor for receiving data from the sky imager and calculated sun position; a multi-input neural network, which makes associations between images, sun positions, and the present and predicted future angles of maximum irradiance.

The present disclosure is further directed to a tracking control method that includes an algorithm that determines the optimal movement of a single-axis tracker to maximize irradiance collection based on current and likely future angles of maximum irradiance while also limiting excessive tracker motion to chase small gains.

Figure 1:
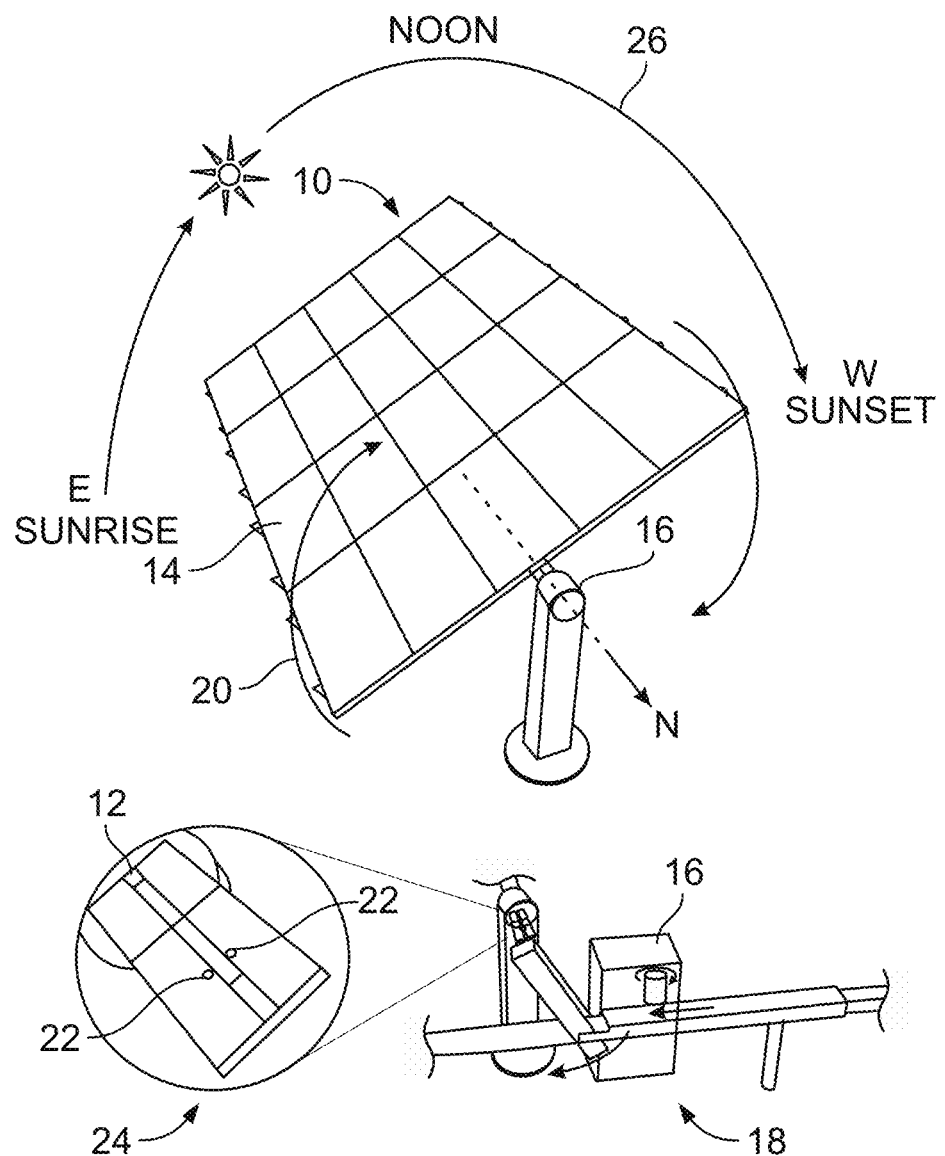
FIG. 1 shows an exemplary embodiment of a single-axis adjustable PV array and control mechanism.

Referring to FIG. 1, an exemplary embodiment of a single-axis PV array 10 is shown. PV array 10 includes multiple PV panels 12 arranged on a platform 14. Platform 14 is rotatably attached to an axial member 16 via a control mechanism 18. Control mechanism 18 controls an angular position, indicated by arrow 20, of platform 14. The position of platform 14 is adjusted by control mechanism 18 in response to irradiance profiles to track the sun at an optimal angle for generating electrical power, as discussed below. PF panels 12 include one or more photo cells 22 and an aiming circuit 24. In the single-axis PV array, the angle 20 of platform 14 rotates on axial member 16 in an East-West arc, as indicated by arrow 26, and is fixed with respect to the North-South direction.

The disclosed system and method is configured to determine optimal single axis tracking angles for cloudy or partly cloudy sky conditions. In an embodiment, the systems and methods may be used in photovoltaic (PV) systems to position PV arrays based on sky images. The systems and methods use a neural network model (see, e.g., FIG. 7) that uses the current sky image and the calculated sun position as inputs. The instantaneous angle of maximal radiation is a function of the solar position, cloud location, and cloud density. The neural network is trained with measurements of global irradiance at 1 degree tilt increments across the sky from east-zenith-west in the same rotation as a horizontal single axis tracker, as ground-truth. The multi-angle irradiance measurements are processed to determine the instantaneous angle with the maximum plane-of-array irradiance.

Figure 2:
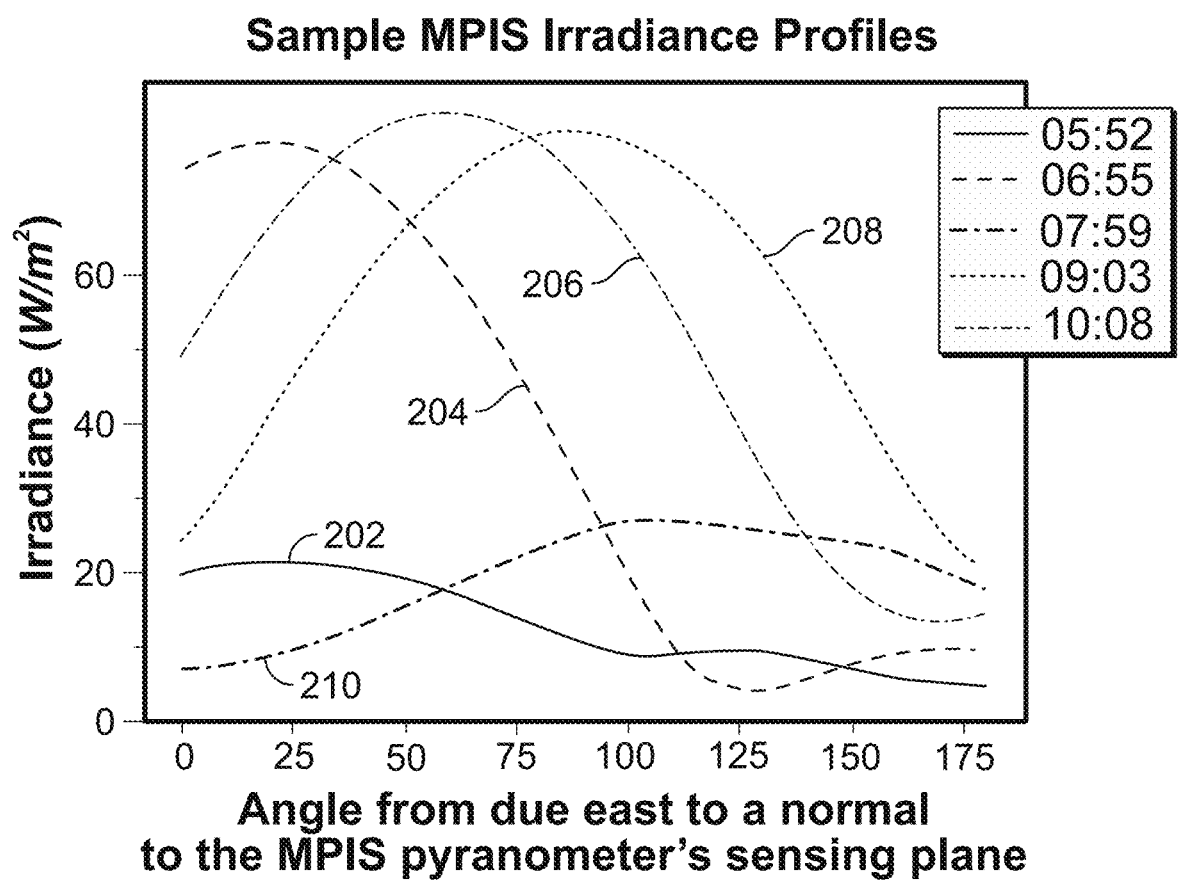
FIG. 2 shows a graphical representation of irradiance profiles of the sky for multiple times of the day.

Referring next to FIG. 2, sample profiles for different times on the same day are illustrated. This day is clear in the morning and progressively becomes more cloudy, which can be seen in a decrease in peak insolation and the maximum of the curve shifting towards the normal (180°). The sensor that generates the images (see, e.g., FIGS. 3 through 6) is a Multi-Planar Irradiance Sensor, or MPIS. The MPIS sensor takes single-axis sweeps of the sky from the eastern horizon to the western horizon, and records the irradiance profiles in FIG. 2. This profiling provides direct measurement of the angle of maximum Plane-of-Array (POA) irradiance, and allows comparison of solar insolation for different tracker positions for the same time. FIG. 2 shows multiple MPIS curves on different times during the same day as the sample of sky images shown in FIGS. 3 through 6.

Figure 3:
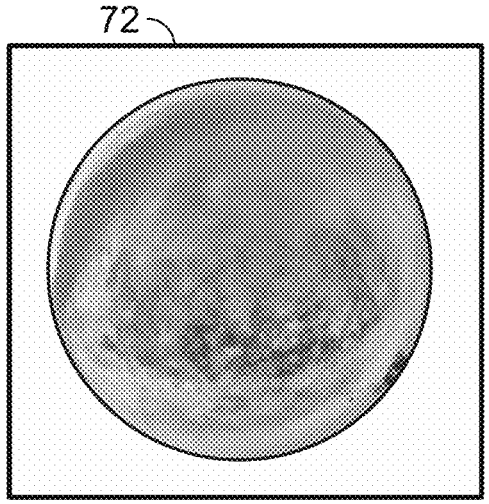
FIG. 3 shows an example of a cloudy image produced by a sky camera.
Figure 4:
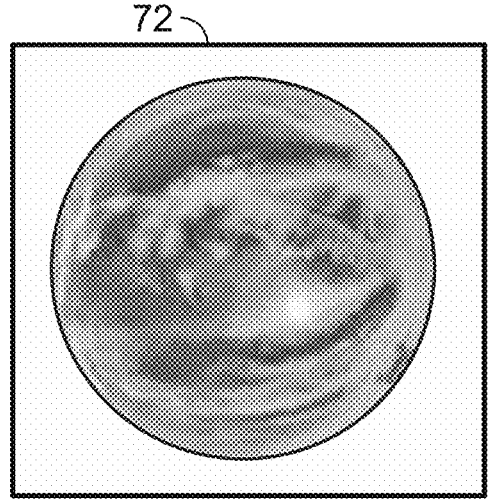
FIG. 4 shows an example of the partly cloudy sky image produced by the sky camera at a different time of the day.
Figure 5:
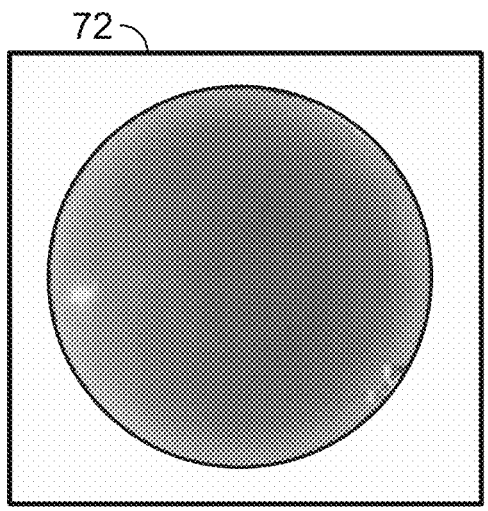
FIG. 5 shows an example of the clear sky image produced by the sky camera at a different time of the day.
Figure 6:
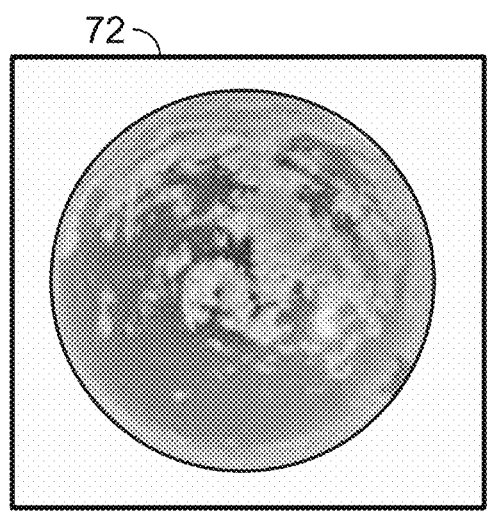
FIG. 6 shows an example of the sky image with rain and clouds produced by the sky camera at a different time of the day.

At 5:52 a.m., MPIS sky camera generates an irradiance profile 202 when the sky is clear. Irradiance values are plotted over a range of angles from 0° to 180° from due east to a normal to the MPIS pyranometers sensing plane. Irradiance profile 204 represents MPIS data (watts per square meter) generated at 6:55 a.m., and irradiance profile 206 at 7:59 a.m. indicates a slightly more cloudy sky than profile 204. At 9:03 a.m. irradiance profile 208 is comparable with profile 204, with a peak irradiance value shifted to the west. Next, at 10:08 a.m., the irradiance profile 210 indicates lower irradiance values than FIG. 3 shows an example of a cloudy image produced by a sky camera. FIG. 4 shows an example of the partly cloudy sky image produced by the sky camera at a different time of the day. FIG. 5 shows an example of the clear sky image produced by the sky camera at a different time of the day. FIG. 6 shows an example of the sky image with rain and clouds produced by the sky camera at a different time of the day.

Figure 7:
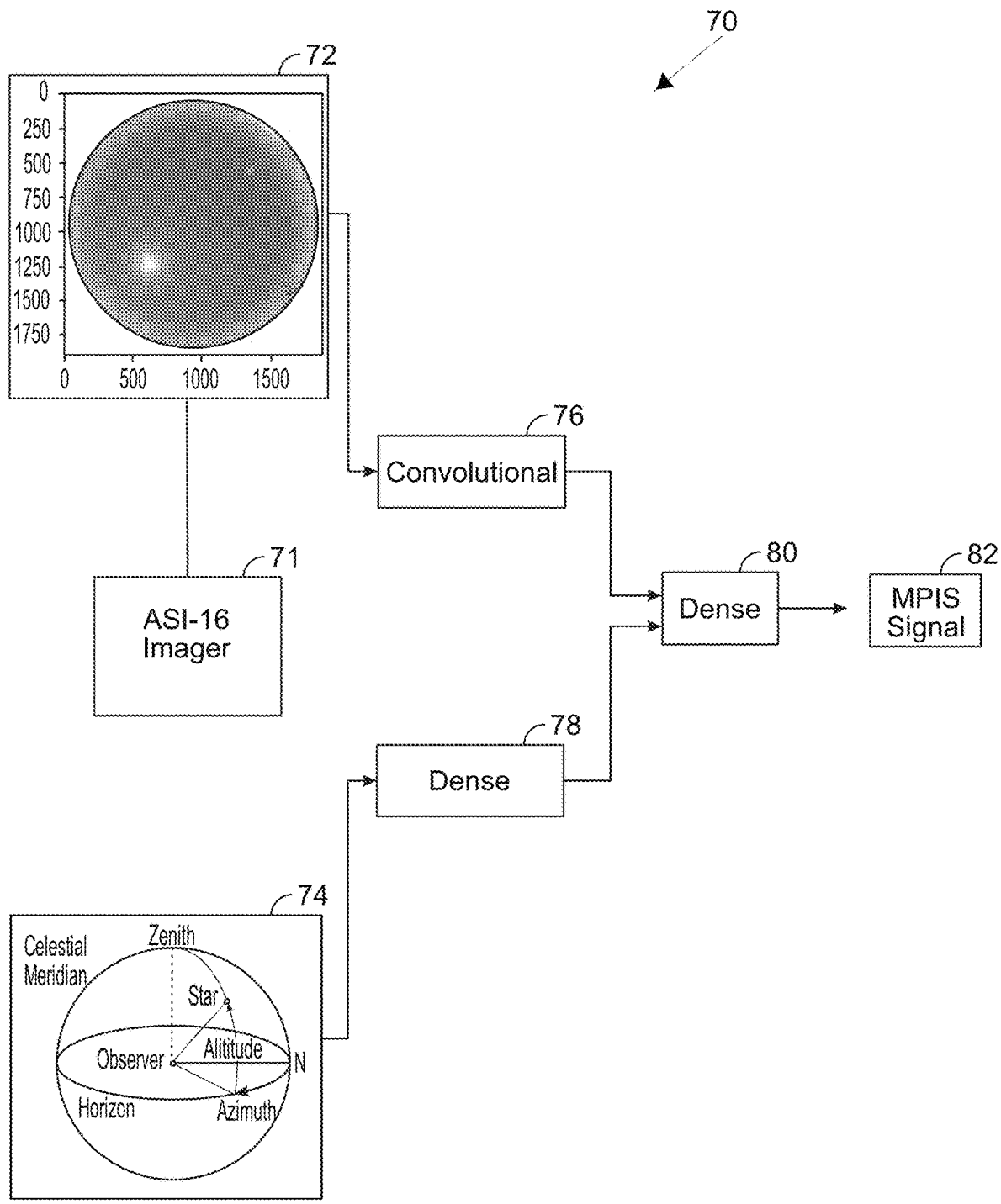
FIG. 7 shows an exemplary neural network diagram of the present disclosure.

Referring next to FIG. 7, a neural network system 70 according to an embodiment of the disclosure includes a sky camera 71 that produces sky images 72. The sun positions are independently calculated using the times and geographic position at which the sky images were captured. The sun position data set 74 is prepared and provided as input to a neural network processor.

The neural network system 70 and processor is a multi-input neural network, which makes associations between images, sun positions, and the angle of maximum irradiance. The neural network 70 uses the sky image 72 and sun position 74 to predict a current angle of maximum irradiance, the likely persistence of current weather conditions, and the likely future angles of maximum irradiance.

The predictions of current and future angles of maximum irradiance are input to an algorithm that determines the optimal movement of a 1-axis tracker to maximize irradiance collection based on current and likely future angles of maximum irradiance. The algorithm accounts for physical limitations of the tracker, e.g., maximum movement speed and maximum tilt angle, as well as energy costs of tracker movement, to provide instructions to a control system to move a physical tracker to maximize overall solar energy yield. In various embodiments, the control system may be, but is not limited to, a PV array alignment and correction system (not shown).

The neural network 70 may be trained prior to implementation with sky images and calculated sun position as inputs, and an additional multi-angle irradiance measurement as ground-truth. The multi-angle irradiance measurements collected by the sensor in half-degree increments from 0 to 180 degrees, where 0 degrees is due east, 90 degrees is at the zenith, and 180 degrees is due west, thereby tracking solar position as it moves across the sky. The angle at which the irradiance is at its maximum is the target angle for the neural network. In an embodiment, neural network 70 may be a supervised learning algorithm which learns adaptively from many of these examples. The sky image, sun position, and multi-angle irradiance data may be collected on one-minute intervals, which allows a sizeable training corpus. The training of the neural network is a high-dimensional optimization problem, solved via gradient descent-based methods. A convolutional layer module 76 processes image data 72 for the network 70 to learn spatial detail in the images, and dense, fully connected layer modules 78, 80 create associations between image features, solar position, and the output irradiance angle, as a nonlinear, parametric regression. The neural network 70 can learn arbitrary functions on the reals without any constraint to structure; classical regression models lack this flexibility. The network is trained on a graphics processing unit (GPU) and afterward can be utilized on any x86_64 hardware.

The neural network 70 processes additional information in the form of sky images to predict optimal tracker positioning. Images 72 provide a data source of data, e.g., in an embodiment a single image shows the current sky conditions. A sequence or series of images contains more information, such as the severity of weather conditions, direction of cloud movement, and more. This time series information is taken into account by the convolutional part of the neural network 70. Neural network 70 may apply a sliding filter methodology to learn features of the images such as clouds or other local weather conditions or patterns.

As shown in FIGS. 3 through 6, information can be extracted from sky images associated with varying conditions. One aspect is identifying clouds in the images. The presence of clouds in the sky results in a different irradiance profile from the profile of a clear sky. In the past, cloud area was error prone as it was generally extracted via a simple threshold. The disclosed method employs a hue-saturation-value, or HSV, color space, to generate a clear delineation between cloud and sky using an adaptive intensity threshold operation for segmentation.

The location of the sun may be identified in an image by thresholding the red channel of the image. Similarly, the center of the sky may be located by thresholding the blue channel. However, image detection of the sun's position is unnecessary due to its ease of calculation from the date/time and location of the camera.

In order to determine the effects of cloud cover on irradiance profiles, classical image processing methods alone are inadequate due to the limitations described above. A neural network-based method for predicting angular profiles of POA irradiance from sky images is disclosed as follows.

Referring again to FIG. 7, a multi-input convolutional neural network 70 is provided to predict irradiance profiles. Multi-input neural networks may be used in other applications, e.g., to identify flowers from multiple different angles. Similarly, sky images contain a large amount of qualitative information about the current status of the sky. The multi-input structure includes additional relevant information to the angular irradiance profile (see, e.g., FIG. 2) such as calculated solar position and clear-sky irradiance.

A convolutional neural network is a method that applies a small filter, or kernel, which convolves over an image. The convolutional operation generates a matrix where each entry is the dot product of the filter and each set of points from the image.

This operation is expressed mathematically in Eq. 1:

$$(I*K)_{i,j} = \sum_{m=1}^{k}\sum_{n=1}^{k} K_{m,n} I_{i+m-1,j+n-1} + b$$

where I is the image matrix of shape (i, j), b is a bias term, and K is the kernel matrix. In an embodiment of the neural network, K is usually of size (3,3) or (5,5). The weights of the kernel K, i.e., the numbers inside the matrix, are learned via back-propagation like the weights and biases of a fully connected layer.

The second input 74 to the neural network 70 is the position of the sun relative to the sky camera, given in a spherical coordinate system. The position of the sun in the sky can be calculated for a given time of day by any of a variety of known methods. In an embodiment, a solar position method is disclosed by Reda and Andreas of the National Renewable Energy Laboratory (NREL), [see, e.g., I. Reda and A. Andreas, "Solar position algorithm for solar radiation applications," vol. 76, no. 5, pp. 577-589. [Online]]. This calculation provides the location of the sun in terms of zenith and azimuth, which is fed into the neural network 70 in a multilayer perceptron-style sub-network. This sub-network can be considered a parallel branch of the whole that is responsible for its own specialized computation. Without intending to be bound by theory, it is believed that the neural network maps the spherical coordinates onto the image, thereby locating the sun irrespective of cloud cover. In order to do so, the two sub-networks, i.e., the CNN and the multilayer perceptron, are subsequently joined.

In the final combination step 80, dense, or fully-connected, outputs of the two sub-networks 76, 78 are concatenated and fed into a final sequence of dense layers. The output generated by step 80 is a regression vector of shape N, where N is the number of points to approximate angles of irradiance. The MPIS sensor 82 samples points over the 180 degree range from horizon to horizon, at predetermined angles. In an embodiment, N=90 is optimal as easiest to train. A finer regression results in a model that is more difficult to train and prone to overfitting. Thus, the target of the model equals the number of output neurons equals N, as the MPIS curves are pre-processed prior to passing them to the model.

The points in the training data are then re-sampled using the Fourier method, and the model is then trained on the downsampled data, generating an output of the same dimension. The Fourier downsampling method transforms the data into the frequency domain and removes the second and third groups of elements having the highest frequency components. As the data are real numbers, the generated FFT results in mirrored complex conjugates in the lower half of the transformed space. Thus, the middle 50% is removed to preserve this symmetry while downsampling. The samples with the highest frequencies are removed. In order to compare the downsampled output and the true value, the model output is padded via equal repetition of elements, or Fourier upsampling. However, this series of transforms and the additional error in the predicted curves can sometimes cause a jagged model output, whereas real angular irradiance profiles are smooth.

Figure 8:
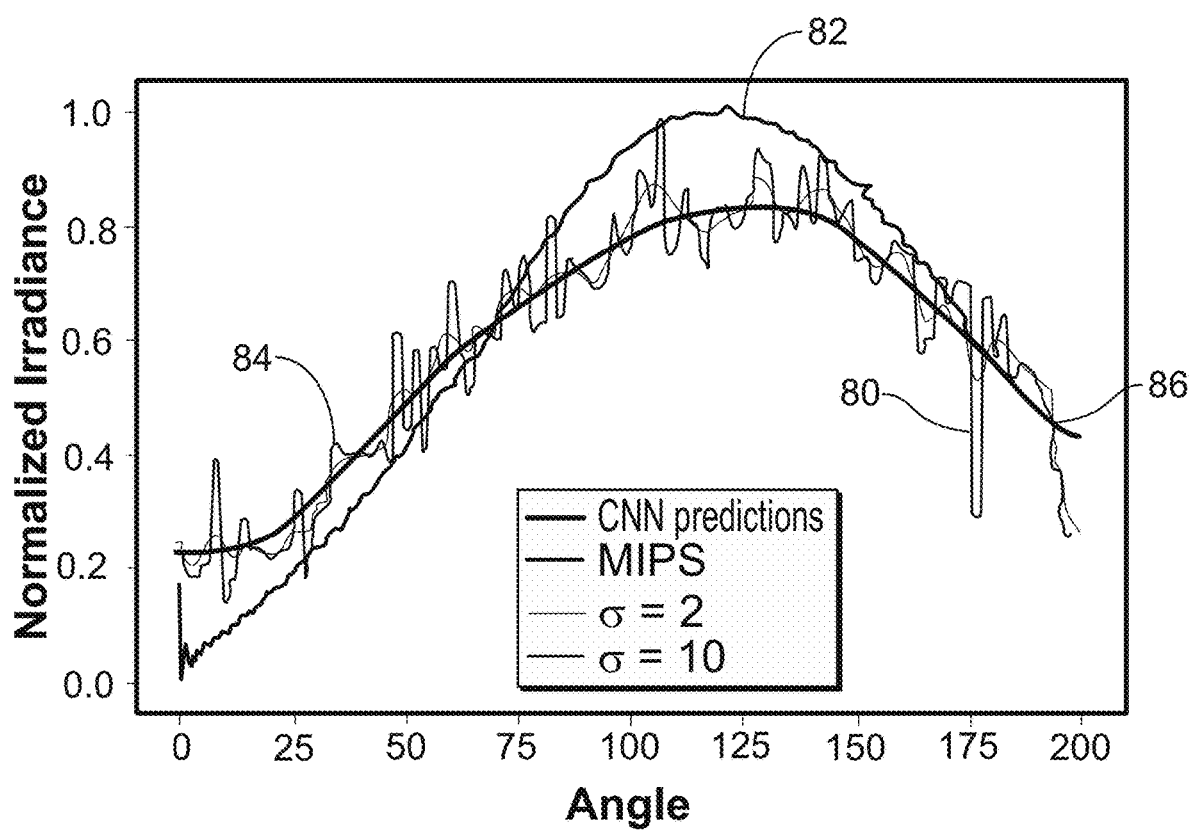
FIG. 8 shows a smoothed model output using a Gaussian kernel.

Gaussian smoothing, a common technique in image and signal processing, can be applied to smooth the curve, assuming Gaussian error. This method is calibrated by the a parameter of the underlying distribution, which specifies a higher or lower degree of smoothness. The model output after applying the Gaussian smoothing kernel is shown in FIG. 8. The CNN prediction for normalized irradiance is indicated by trace line 80. Line 82 represents the normalized irradiance of the MIPS signal. Line 84 represents the normalized irradiance output for σ=2, and line 86 represents the normalized irradiance output for σ=10.

Training this model requires a slight modification of gradient descent. This is because the model is split into two sub-networks; typically, the model is sequential and the gradient flows directly backwards. Here the model forks into two branches. In this case, there are N outputs and 2 inputs.

Thus, the rule for gradient flow can be described using the Chain Rule in Eq. 2 as follows.

$$\frac{\partial \mathcal{L}}{\partial w_i} = \sum_{n=1}^{N} \frac{\partial \mathcal{L}}{\partial y_n} \frac{\partial y_n}{\partial w_i} \qquad \text{Equation 2}$$

where $\mathcal{L}$ is the loss function, $w_i$ is a weight and $y_n$ is an output.

The loss function is the mean squared error, MSE, of the samples $Y_i$ in Eq. 3:

$$MSE = \frac{1}{n}\sum_{i=1}^{n}(Y_i - \hat{Y}_i)^2 \qquad \text{Equation 3}$$

Contribution to the overall loss (Eq. 3) can be calculated for each weight. As the loss propagates through the network, both sub-networks are updated according to the overall loss. Since the model outputs a vector, the total loss equals the sum of the loss of the individual elements.

The normalization process constrains the value of each element to be between zero and a constant f, where f depends on the specific normalization procedure used. To reflect this constraint, a custom activation function for the output may be used. Usually, no activation is provided for a regression output.

Since the range of values is known a priori, the network may be preprogrammed by applying an activation function in Eq. 4.

$$\epsilon\text{-ReLU}(x) = \min(\text{ReLU}(x), \epsilon) \qquad \text{Equation 4}$$

where $\epsilon$ is set to the maximal acceptable value and ReLU(x) is the standard Rectified Linear Unit activation function. For example, if the data is normalized between 0 and 1, setting $\epsilon=1$ will prevent the model from overshooting without affecting the true values. Thus, the activation function is linear over the range [0, $\epsilon$], unlike a nonlinear sigmoid, which may cause outputs to trend towards the extremes. Additionally, if the model encounters a severe outlier or other anomaly when predicting a new sample, then the amount of possible error can be limited.

The MPIS signal 82 should be normalized or transformed to mitigate memorization of irradiance parameters by the system, e.g., irradiance, date and time. The ideal, clear-sky global horizontal irradiance, or GHI, is easily calculable for a given time, latitude, and longitude. In one exemplary embodiment, the Ineichen model is used. Normalizing by this quantity results in a much smoother curve that preserves relative magnitudes. In an embodiment MPIS signal 82 may be normalized by the clear sky GHI, at solar noon. This normalization method results in all curves, regardless of seasonality, to be within the same range of values. The values range in magnitude from zero to about four. This is because maximum value of the MPIS signal (maximum POA irradiance) on a clear day will always be greater than or equal to the projected clear-sky GHI.

The invention being thus described, it will be obvious that the same may be varied in many ways. Such variations are not to be regarded as a departure from the spirit and scope of the invention, and all such modifications as would be obvious to one skilled in the art are intended to be included within the scope of the appended claims. It is intended that the scope of the invention be defined by the claims appended hereto. The entire disclosures of all references, applications, patents and publications cited above are hereby incorporated by reference.

In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims. While the exemplary embodiments illustrated in the figures and described herein are presently preferred, it should be understood that these embodiments are offered by way of example only. The order or sequence of any processes or method steps may be varied or re-sequenced according to alternative embodiments.

The present application contemplates methods, systems and program products on any machine-readable media for accomplishing its operations. The embodiments of the present application may be implemented using an existing computer processors, or by a special purpose computer processor for an appropriate system, incorporated for this or another purpose or by a hardwired system.

As noted above, embodiments within the scope of the present application include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

The invention claimed is:

1. A solar tracking system for controlling an angular position of a photovoltaic power system, comprising:
an imaging device for capturing images of the sky; a solar position data generating module; and a control system comprising a neural network having:
a plurality of convolutional layers configured to generate a first output associated with the images;
a solar position data module;
a first dense layer module for receiving the solar position data and generating a second output;
a second dense layer module for receiving the first output and the second output and generating a concatenated data sequence; and
a processor; the processor configured to:
generate a multi-planar irradiance signal (MPIS) in response to the concatenated data sequence; and
determine an angular position of the PV power system and adjust the angular position in response to an angle of maximum irradiance.

2. The system of claim 1, further comprising a filter; wherein the convolutional neural network is configured to apply the filter that convolves over the images.

3. The system of claim 1, wherein the processor is further configured to generate a matrix having a plurality of entries, each entry comprising a dot product (I*K) of the filter and a set of data points from the respective image.

4. The system of claim 3, wherein the filter dot product comprises a transfer function:

$$(I*K)_{i,j} = \sum_{m=1}^{k}\sum_{n=1}^{k} K_{m,n} I_{i+m-1, j+n-1} + b$$

wherein I is an image matrix of a shape (i, j), b is a bias term, and K is a kernel matrix.

5. The system of claim 4, wherein the kernel matrix comprises a matrix of weighted values; each of the weighted values being determined via back-propagation of the neural network, and weight values for the first dense layer module and the second dense layer module.

6. The system of claim 5, wherein the kernel matrix comprises a (3×3) weighted value matrix or a (5×5) weighted value matrix.

7. The system of claim 1, wherein solar position data comprises a zenith and an azimuth in a multilayer perceptron sub-network and the CNN maps the zenith and the azimuth onto the sky image data points, and wherein the CNN and the multilayer perceptron subnetwork are combined.

8. The system of claim 1, wherein the adjusted angle of the photovoltaic (PV) power system is based on the concatenated data sequence.

9. A method of solar tracking for controlling a PV power system, the method comprising:
capturing images of a sky;
generating a solar position data;
providing a convolutional layer neural network (CNN);
generating a first output associated with the sky images;
receiving the solar position data and generating a second output;
receiving the first output and the second output;
generating a concatenated data sequence;
generating a multi-planar irradiance signal (MPIS) in response to the concatenated data sequence;
determining an angular position of the PV power system; and
adjusting the angular position in response to an angle of maximum irradiance based on the concatenated data sequence.

10. The method of claim 9, further comprising the steps of: applying a filter by the CNN; and
convolving the filter over the sky images.

11. The method of claim 10, further comprising:
generating a matrix having a plurality of entries, each entry comprising a dot product (I*K) of the filter and a set of data points from the respective image.

12. The method of claim 11, wherein the filter dot product having a transfer function:

$$(I * K)_{i,j} = \sum_{m=1}^{k}\sum_{n=1}^{k} K_{m,n} I_{i+m-1, j+n-1} + b$$

wherein I is an image matrix of a shape (i,j), b is a bias term, and K is a kernel matrix.

13. The method of claim 12, further comprising determining a weight value associated with each value of the kernel matrix via the neural network, and weight values for the first dense layer module and the second dense layer module.

14. The system of claim 13, wherein the kernel matrix comprises one of: a (3×3) weighted value matrix or a (5×5) weighted value matrix.

15. The method of claim 9, wherein the solar position data comprises a zenith and an azimuth in a multilayer perceptron sub-network and the CNN maps the zenith and the azimuth onto the sky image data points; and wherein the CNN and the multilayer perceptron subnetwork are combined.

16. The method of claim 9, wherein the step of adjusting the angle of the PV power system is based on the concatenated data sequence.

17. The method of claim 9, further comprising:
sampling a plurality of sky data points across 180 degrees from horizon to horizon, the plurality of data points comprising the concatenated data sequence;
resampling the concatenated data sequence;
transforming the concatenated data sequence into a frequency domain;
removing resampled data having the highest frequencies;
applying a Gaussian smoothing function;
calculating a contribution to an overall loss for each weighted value; and updating the MPIS signal output.

18. The method of claim 17, wherein the step of calculating the overall loss comprises:
applying a loss function based on the mean squared error of the sampled data points $Y_i$, the mean square error (MSE) of n samples being calculated as:

$$MSE = \frac{1}{n}\sum_{i=1}^{n}(Y_i - \hat{Y}_i)^2.$$

19. At least one non-transitory machine-readable medium including a plurality of instructions, which when executed by one or more computing devices, cause performance of a method comprising:
capturing images of a sky;
generating a solar position data;
providing a convolutional layer neural network (CNN);
generating a first data set associated with the sky images;
receiving the solar position data and generating a second output;
receiving the first output and the second output;
generating a concatenated data sequence;
generating a multi-planar irradiance signal (MPIS) in response to the concatenated data sequence;
determining an angular position of the PV power system; and
adjusting the angular position in response to an angle of maximum irradiance based on the concatenated data sequence.

20. The at least one non-transitory machine-readable medium of claim 19, further comprising:
sampling a plurality of sky data points across 180 degrees from horizon to horizon, the plurality of data points comprising the concatenated data sequence;
resampling the concatenated data sequence;
transforming the concatenated data sequence into a frequency domain;
removing resampled data having the highest frequencies;
applying a Gaussian smoothing function;
calculating a contribution to an overall loss for each weighted value; and updating the MPIS signal output.

* * * * *